Oct. 9, 1956
C. A. FINERAN
2,766,080
SCREW THREADED PIVOT BEARING WITH LOCKING MEANS
Filed Feb. 10, 1954
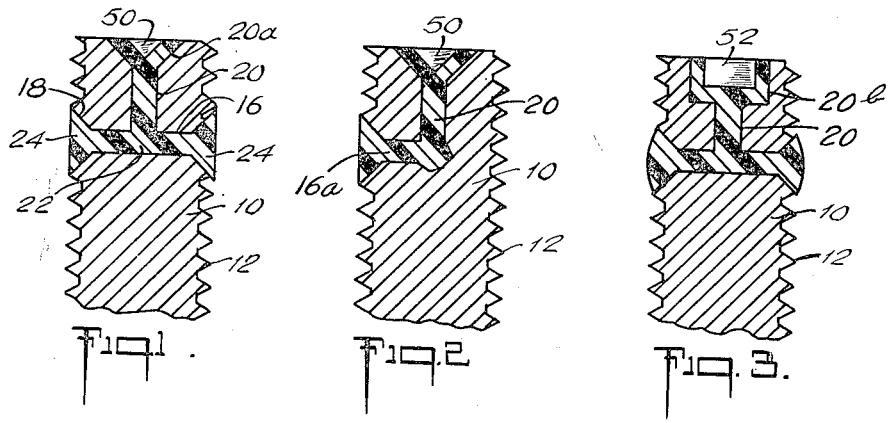
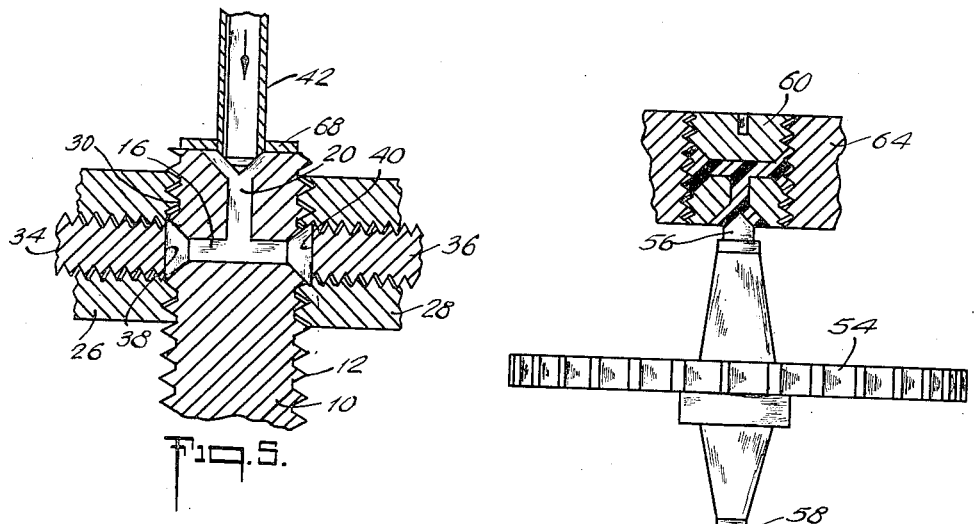
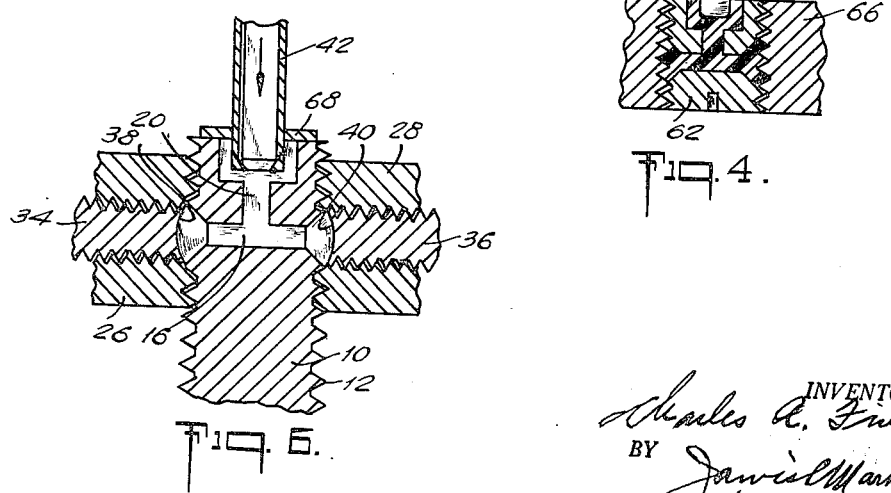
INVENTOR.
Charles A. Fineran
BY Jarvis M. Marble
his Attorney

United States Patent Office 2,766,080
Patented Oct. 9, 1956

2,766,080

SCREW THREADED PIVOT BEARING WITH LOCKING MEANS

Charles A. Fineran, East Orange, N. J., assignor to Elastic Stop Nut Corporation of America, Union, N. J., a corporation of New Jersey Application February 10, 1954, Serial No. 409,360

5 Claims. (Cl. 308—159)

This application is a continuation-in-part of my co-pending application Serial No. 109,694, filed August 11, 1949, now Patent 2,677,149 granted May 4, 1954.

The present invention relates to devices providing externally threaded bodies such as bolts, screws, studs and the like, which may or may not be headed. More particularly, the invention relates to such devices in which self-locking action is provided through the inclusion in the externally threaded body of a locking insert of thread impressionable elastic plastic material having a transversely disposed portion located to have a thread impressed therein by a companion internal thread in another member, so that the latter thread is elastically gripped by the elastic material to hold the threaded parts against relative rotation under the influence of vibration to which they may be subjected in use. Still more particularly, the invention relates to such devices in which the insert of thread impressionable material which provides the locking element, also includes as an integral part of the insert an axially central portion extending longitudinally of and opening through one end of the threaded device.

Various forms of externally threaded self-locking devices embodying inserts of thread impressionable material have heretofore been proposed, but so far as I am aware no such devices have heretofore been proposed which embody inserts of the character contemplated by the present invention.

In accordance with the principles of the present invention such inserts, in addition to transversely extending portions providing one or more openings extending transversely of the threaded body through the threaded surface for locking purposes, also provide an axially central longitudinally extending portion opening through one end of the body to provide not only a conveniently useful means for fixing the insert in the threaded body without resorting to mechanical expedients such as "staking," but also provide means whereby a locking insert, constituted of appropriate material, may be used as the bearing surface for supporting another relatively moving part.

The various specific objects of the invention and the manner in which they may best be attained will best be understood from a consideration of the ensuing portion of this specification in which, by way of example but without limitation, different embodiments of the invention are described.

In the drawings forming a part hereof:

Fig. 1 is a fragmentary section showing an insert formed to provide a pivot bearing in the insert material at the end of the threaded body, in accordance with the principles of the invention;

Fig. 2 is a view similar to Fig. 1 showing an insert the same as that of Fig. 1 with respect to the bearing feature but modified with respect to the locking feature;

Fig. 3 is a view similar to Fig. 1, showing an insert similar to that of Fig. 1 with respect to the locking feature but modified with respect to the bearing feature;

Fig. 4 is a more or less diagrammatic view partly in section, showing pivot bearings having inserts as illustrated in Figs. 1 and 3 with a body rotatably mounted therebetween; and Figs. 5 and 6 are views showing apparatus for forming inserts of the kind shown in Figs. 1 and 3, respectively.

Referring now more particularly to Figs. 1 and 3 of the drawings there is shown two externally threaded devices embodying the invention each having a shank 10 provided with the external thread 12. The shank 10 is provided with a cavity for receiving material forming a locking insert, which cavity comprises a transversely extending diametral bore 16 of relatively small diameter as compared with that of the shank, being countersunk at its ends to provide enlargements 18, and an axially extending bore 20, also small in diameter relative to that of the shank, which extends from bore 16 to one end of the shank. The bores 18 and 20 are filled with an elastic plastic material of moldable and thread impressionable nature providing a locking insert 22 having enlarged or headed portions 24 providing exposed locking surfaces projecting radially at least beyond the minor diameter of the thread 12 to have threads impressed therein when the device is screwed into a companion internal thread, the thread impression being operative to plastically displace material of the insert and compress it so that the insert is placed under pressure and the desired locking action is obtained by the elastic pressure engagement of the locking surface of the insert with the surfaces of the companion thread.

While in most instances a form of insert provided by a transverse bore extending through the shank to provide opposed gripping surfaces may be preferable, the invention is not limited to such construction. In some instances the gripping action of one surface may be sufficient and other factors may make a transverse through bore undesirable, in which case the transverse bore 16a, as shown in Fig. 2 may extend only to the extent necessary to intersect longitudinal bore 20.

Within the scope of the invention any suitable material may be employed for the insert, but by way of example such materials as the class commonly referred to as thermoplastics and including such substances as cellulose derivatives, various synthetic resins such as vinyl and styrene derivatives and the polymeric condensation product of a diabasic acid and a diamene known commercially as nylon may be used, nylon being a preferred material particularly as to certain aspects of the invention for reasons hereinafter more fully pointed out.

With respect to the locking feature the particular forms of inserts illustrated need not necessarily be adhered to, but they do present numerous practical advantages of material importance. By employing the enlarged heads, ample bearing area is secured to provide adequate locking surface while at the same time the relatively small diameter of the bores 16 and 16a results in practically negligible weakening of the strength of the shank. Also, the location of the bore 20 at the axis of the shank has no appreciable adverse effect on mechanical strength.

As will readily be observed, the form of the insert inherently locks it in place in the shank without necessity for working the metal of the shank to form retaining abutments or "stakes" of any kind. Locking material of the kind contemplated does not ordinarily bond itself to a metal surface and consequently plastic deformation and the elastic memory of the entire body of material in the transverse bore is usefully available for locking action. At the same time, the relatively small diameter of the transverse and longitudinal bores, coupled with the fact that they intersect at a right angle, provide a construction which prevents plastic "cold flow" of the compressed insert material sufficient to relieve the internal pressure of the material. In other words, compression of the material due to the impression of threads in the locking portion of the insert does not result in the extrusion by cold flow of material through the longitudinal bore to an extent adversely affecting the locking action.

The exact configuration of the enlarged head portions of the locking section of the inserts is not critical but the conical form shown is advantageous from a production standpoint, since the enlargements can readily be made with a standard countersink producing a recess of a 90° included angle and actual tests have proved such head configurations to be entirely satisfactory. Conical heads with other included angles may be employed within the scope of the invention and if desired, heads of other than conical form may be used.

In all of the embodiments hereinbefore discussed, consideration has been given only to the function of providing a self-locking screw threaded connection. However, the form of insert contemplated by the invention also provides another and highly useful function, by virtue of which self-locking threaded studs or the like may advantageously be employed as adjustable bearing members for pivotally mounted parts.

This additional function derives from the fact that the invention contemplates the employment of an insert having a portion located in an axially central bore 20, which portion of the insert is exposed at the end of the threaded body at the axis thereof, and which may be utilized as a bearing.

As hereinbefore mentioned, nylon is a preferred material from which the locking insert may be made. Actual experience has demonstrated nylon to be a highly suitable material for effecting the desired locking action by having a thread impressed therein by a companion thread. Additionally, however, nylon inherently is possessed of a certain "waxy" surface quality that experience has shown makes it usable as a bearing material for bearings that can satisfactorily be operated without requiring a lubricant. Such "waxy" qualities may be possessed by other thread impressionable plastic materials, so that, so far as the present invention is concerned, the invention is not necessarily limited to the employment of nylon but may embrace insert materials having equivalent properties.

In constructions where nylon or equivalent insert material having appropriate bearing qualities is employed, the end of the central longitudinal bore 20 may be advantageously relatively widely flared as at 20a to provide a conical socket for the reception of an enlarged head portion at the end of the recess, which head portion is provided with a conical recess or socket 50 for the reception of a pivot bearing, as shown in Fig. 1.

A similar construction is shown in Fig. 2, the central axial portion of the insert again being headed and coniaxially recessed at 50 to provide support for a suitable pivot.

In Fig. 3 a different specific form of pivot bearing is shown in which the general form of the insert is the same as shown in Fig. 1. In this case the bore 20, instead of being conically flared at its outer end, is counter-bored as at 20b to provide a cylindrical socket in which the headed end of the insert is provided with a cylindrical bearing recess 52.

By way of illustrating the utility of such devices there is shown, more or less diagramatically in Fig. 4 an arrangement wherein a relative body 54 such as a balance wheel or a gear is provided with pivots 56 and 58 mounted to turn in self-locking adjustable pivot bearing members 60 and 62, respectively, which are shown as being in self-locking threaded engagement with fixed supporting members 64 and 66.

As will be evident from the drawing the supports for the member 54 are readily adjustable to properly support the member with the desired amount of (or lack of) clearance or play, the desired adjustment being obtained by the self-locking nature of the connection between the bearing members and the fixed supports, and the necessity for lubrication of the bearings additionally being avoided, if nylon or equivalent material suitable for a locking insert is employed. The construction illustrated is particularly useful for installation in inaccessible places, difficult to reach either for the purposes of adjustment or for the purpose of lubrication.

Advantageously the inserts may be formed by an injection molding operation utilizing apparatus of the general kind disclosed in my aforementioned Patent 2,677,149, and shown in Figs. 5 and 6. The apparatus shown in each of Figs. 5 and 6 comprises separable die blocks 26 and 28 providing between their confronting faces a die cavity having a bore provided with an internal thread 30 and adapted to be clamped against the device into which the insert material is to be injected. Such blocks may readily be made by suitably boring and threading a solid die block and thereafter parting it diametrally of the bore, the material removed by the parting operation providing a highly desirable clearance space between the blocks when they are clamped in position, such clearance compensating for variations in thread size of the articles treated and insuring tight contact in all cases between the threads of the blocks and the thread of the article clamped between them.

The blocks 26 and 28 are also bored transversely and preferably threaded to receive the plugs 34 and 36, the inner faces 38 and 40 of which are shaped and positioned to determine the contour and positions of the exposed locking faces of the insert. As previously noted, the locking faces of the insert are positioned radially outwardly at least beyond the minor diameter of the thread, so as to be engaged by a companion thread. They may however extend beyond the pitch diameter to, or even beyond, the major diameter to secure the best results depending upon the specific physical properties of the locking material used, and being determined by the positioning of the inner faces 38 and 40 of the plugs in the die blocks. While for ease of manufacturing and adjustment of the depths of the recesses in the die blocks, threaded plugs are advantageous, it is apparent that other means may be employed, such as plugs having driving fits in the die blocks, or by forming the recesses by a machining operation.

The locking insert material is injected through an injection nozzle 42 under pressure, usually accompanied by heat in the case of thermoplastic materials. The close pressure contact of the threaded die blocks is sufficient to prevent appreciable flow of the material circumferentially away from the enlarged locking faces of the insert. As will be apparent to those skilled in the art, the dies 26, 28, and nozzle 42 are readily adapted to be mounted for use in injection molding machines of known kind in which multiple die assemblies may be used, so that a plurality of units may have insert material injected thereinto simultaneously by a single stroke or "shot" of the machine. Thus economy of production is readily attained.

The injection nozzle 42 is provided with a collar 68 adapted to seat against the end of the body 10 to provide a seal for preventing flow of the injected material from the cavity, the injection nozzles as shown advantageously being shaped so that they may be inserted into the enlarged ends of the cavities to form cores which will leave desired recesses when withdrawn after the injection operation. Obviously, the entire cavities may be filled by the injection operation and bearing recesses of desired configuration subsequently formed in the inserts by an appropriate machining operation.

From the foregoing it will be apparent that the invention may be embodied in many different specific forms and it is accordingly to be understood as embracing all devices falling within the scope of the appended claims.

What is claimed is:

1. A screw threaded pivot bearing comprising an externally threaded body having a cavity therein having at least two openings, one of said openings being located in the threaded surface of the body and the other being located at the central axis at one end of the body, said openings being connected by an axial bore extending centrally of the body from the opening in the end of the body and a transverse bore extending from the opening in the threaded surface of the body and intersecting the axial bore, and a locking insert of thread impressionable elastic bearing material filling said cavity and including an exposed portion projecting from the opening located in the threaded surface at least beyond the minor diameter of the thread, said elastic bearing material in said axial bore constituting a pivot bearing.

2. A device as defined in claim 1, in which the material of said insert is nylon.

3. A device as defined in claim 1, in which said transverse bore is enlarged at the opening thereof in said threaded surface, to provide for an enlarged head portion of the insert for engagement with a companion thread.

4. A device as defined in claim 1, in which said axial bore is enlarged at the opening thereof in the end of said body to provide an enlarged head portion of said insert at the end of said body.

5. A device as defined in claim 1, in which both said transverse and said axial bores are enlarged at the openings thereof, to provide for enlarged head portions of said insert presenting exposed surfaces of larger area than the cross sectional areas of the minor portions of the respective bores.

References Cited in the file of this patent

UNITED STATES PATENTS

| | | |
|---|---|---|
| 2,286,336 | Brooke | June 16, 1942 |
| 2,568,274 | Clark | Sept. 18, 1951 |
| 2,672,173 | Chantler | Mar. 16, 1954 |
| 2,677,149 | Fineran | May 4, 1954 |